United States Patent
Birk et al.

(10) Patent No.: US 7,810,132 B2
(45) Date of Patent: *Oct. 5, 2010

(54) APPLICATION SERVER OBJECT-LEVEL SECURITY FOR DISTRIBUTED COMPUTING DOMAINS

(75) Inventors: Peter Daniel Birk, Austin, TX (US); Ching-Yun Chao, Austin, TX (US); Hyen Vui Chung, Round Rock, TX (US); Carlton Keith Mason, Austin, TX (US); Ajaykumar Karkala Reddy, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 12/123,693

(22) Filed: May 20, 2008

(65) Prior Publication Data

US 2008/0222697 A1 Sep. 11, 2008

Related U.S. Application Data

(63) Continuation of application No. 10/246,909, filed on Sep. 19, 2002, now Pat. No. 7,448,066.

(51) Int. Cl.
*H04L 29/06* (2006.01)
*G06F 17/00* (2006.01)
*G06F 15/16* (2006.01)
*G06F 9/44* (2006.01)
*G06F 9/00* (2006.01)

(52) U.S. Cl. .............. 726/1; 726/6; 726/14; 713/155; 713/157; 719/315; 719/316; 709/225

(58) Field of Classification Search .............. 726/1; 719/316
See application file for complete search history.

(56) References Cited

U.S. PATENT DOCUMENTS 5,802,291 A * 9/1998 Balick et al. ............... 709/202

(Continued)

FOREIGN PATENT DOCUMENTS

| KR | 2000-0069947 | 11/2000 |
| KR | 102002016711 A | 3/2002 |
| WO | WO98/38759 | 9/1998 |

OTHER PUBLICATIONS

Schmidt, Douglas. Gokhale, Aniruddha. Harrison, Timothy. Parulkar, Guru. "A High-Performance End System Architecture for Real-Time CORBA". Feb. 1997. Communications Magazine. Relevant pp. 72-77. Found on the World Wide Web at: http://ieeexplore.ieee.org/iel1/35/12278/00565659.pdf?tp=&arnumber=565659&isnumber=12278.*

(Continued)

*Primary Examiner*—William R Korzuch
*Assistant Examiner*—Jeremiah Avery
(74) *Attorney, Agent, or Firm*—Robert H. Frantz; David A. Mims, Jr.

(57) ABSTRACT

Objects on application servers are distributed to one or more application servers; a user is allowed to declare in a list which objects residing on each application server are to be protected; the list is read by an interceptor; responsive to exportation of a Common Object Request Broker Architecture ("CORBA") compliant Interoperable Object Reference ("IOR") for a listed object, the interceptor associates one or more application server security flags with interfaces to the listed objects by tagging components of the IOR with one or more security flags; and one or more security operations are performed by an application server according to the security flags tagged to the IOR when a client accesses an application server-stored object, the security operations including an operation besides establishing secure communications between the client process and the server-stored object.

18 Claims, 6 Drawing Sheets

U.S. PATENT DOCUMENTS

| | | | |
|---|---|---|---|
| 5,908,469 A | | 6/1999 | Botz et al. |
| 6,044,409 A * | | 3/2000 | Lim et al. .................. 719/315 |
| 6,219,787 B1 | | 4/2001 | Brewer |
| 6,226,746 B1 * | | 5/2001 | Scheifler ........................ 726/1 |
| 6,298,478 B1 | | 10/2001 | Nally et al. |
| 6,314,409 B2 * | | 11/2001 | Schneck et al. ............... 705/54 |
| 6,321,334 B1 * | | 11/2001 | Jerger et al. .................... 726/1 |
| 6,330,677 B1 * | | 12/2001 | Madoukh ....................... 726/2 |
| 6,393,605 B1 | | 5/2002 | Loomans |
| 6,442,460 B1 * | | 8/2002 | Larson et al. ................. 701/33 |
| 6,453,320 B1 * | | 9/2002 | Kukura et al. ................ 707/10 |
| 6,487,665 B1 * | | 11/2002 | Andrews et al. ............. 726/26 |
| 6,526,406 B1 * | | 2/2003 | Suzuki et al. ................. 707/10 |
| 6,594,763 B1 * | | 7/2003 | Madoukh ....................... 726/1 |
| 6,633,923 B1 * | | 10/2003 | Kukura et al. ............... 719/316 |
| 6,687,761 B1 * | | 2/2004 | Collins et al. ............... 719/315 |
| 6,795,791 B2 | | 9/2004 | Gorman |
| 6,820,267 B2 * | | 11/2004 | Christensen et al. ........ 719/315 |
| 6,868,441 B2 * | | 3/2005 | Greene et al. ............... 709/220 |
| 6,958,553 B2 * | | 10/2005 | Ichii et al. ..................... 310/15 |
| 6,968,553 B1 * | | 11/2005 | Theeten ....................... 719/311 |
| 6,976,261 B2 * | | 12/2005 | Callsen et al. .............. 719/316 |
| 6,981,265 B1 * | | 12/2005 | Rees et al. .................. 719/313 |

OTHER PUBLICATIONS

Mili, Hafedh. Mcheick, Hamid. Dargham, Joumana. Sadou, Salah. "CorbaViews: Distributing Objects With Views". 2001. ACS/IEEE International Conference on Computer Systems and Applications. Relevant pp. 369-378. Found on the World Wide Web at: http://ieeexplore.ieee.org/iel5/7431/20212/00934017.pdf?tp=&arnumber=934017&isnumber=20212.*

"IBM Wedsphere V4.0 Advanced Edition Handbook", by M. Endrei, R. Cluning, W.Daomanee, J. Heyward, A. Iyengar, I. Mauny, T. Naumann, A. Sanchez, IBMRedbooks, International Technical Support Organization, Research Triangle Park, NorthCarolina, downloaded from http://www.redbooks.ibm.comlredbooks. on 4/2812004, pp. 42,59-60,85-95,103-124, 739-777.

"[OB-Users] Using IORInterceptor Conditioanlly," Orbacus Users Mailing List, by BenoitFoucher, downloaded from http://mail.ooc.nf.ca/pipermail/ob-usersl200 I-June/018451.html on 4/27104.

"Orbitz Wonderwall Administrator's Guide", Iona Technolgoies PLC, downloaded from http://www.iona.comIsupport/docs/manuals/orbix/3 3/pdf/ orbixwondera 1l33 _ admin.pdf, on Apr. 27, 2004, pp. 12,134, and 173.

"Web Services Flow Language (WSFL 1.0)", IBM Technical Document, IBM Software Group, by F. Leymann, downloaded from http://www-306.ibm.comlsoftware/solutions/webservices/pdf/WSFL.pdf, on Apr. 27, 2004, pp. 7, 24, and 25-83.

"Security Service Specification," Object Management Group, downloaded from http://lwww.omg.orgIcgi-binJapps/doc?formal/02-03-11.pdf on Apr. 27, 2004, pp. 3-4.

Mili, Hafedh. Mcheick, Hamid. Dargham, Joumana. Sadou, Salah. "CorbaViews: Distributing Objects With Views". 2001. ACSIIEEE International Conference on Computer Systems and Applications. Relevant pp. 369-378. Found on the World Wide Web at: http://ieeexplore.ieee.org/iel5/7431/20212/00934017. pdf?tp=&arnumber=934017&isnumber=20212.

Schmidt, Douglas. Gokhale, Aniruddha. Harrison, Timothy. Parulkar, Guru. "A High-Performance End System Architecture For Real-Time CORBA". Feb. 1997. Communications Magazine. Relevant pp. 72-77. Found on the World Wide Web at: http://ieeexplore.ieee.org/iel1 /35/12278/00565659.pdf?tp=&arnu mber=565659&isnu mber=12278.

"IBM WebSphere Application Servers CORBA Interoperablity", IBM WebSphere document version 2.3, published Mar. 21, 2002, downloaded from http://www.ibm.com. 60 pgs.

"Web Services Management Approaches", by J.A. Farell and H. Kreger, IBM Systems Journal, vol. 41, No. 2/ 2002, pp. 212 through 227, downloaded from http://www.ibm.com.

"JMX", B. Newport, downloaded on Sep. 4, 2002, from http://www.theserverside.com. 6 pgs.

Wangham, M.S.; Lung, L.C.; Westphall, C.M. and Fraga, J.S. "Integrating SSL to the JaCoWeb Security Framework: Project and Implementation". From the Integrated Network Management Proceedings, 2001 IEEEIIFIP International Symposium on May 14-18, 2001. pp. 779-792. Obtained from: http://ieeexplore.ieee.org/ iel5/7332/ 19847100918080.pdf.

USPTO, Image File Wrapper contents for U.S. Appl. No. 10/246,909, parent application to the present application, including non-patent literature items 1-11 listed above and foreign patent documents 1-3 listed above, retrieved on Dec. 15, 2009 from http://www.uspto.gov.

* cited by examiner

APPLICATION SERVER OBJECT-LEVEL SECURITY FOR DISTRIBUTED COMPUTING DOMAINS

CROSS-REFERENCE TO RELATED APPLICATIONS

Claiming Benefit Under 35 U.S.C. 120

This is a continuation of U.S. patent application Ser. No. 10/246,909, filed on Sep. 19, 2002 by Peter Daniel Birk, which is now U.S. Pat. No. 7,448,066.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 10/246,909, filed on Sep. 19, 2002 by Peter Daniel Birk, now under allowance, is incorporated by reference in its entirety.

The following publications by IBM Corporation are incorporated by reference in their entireties into this disclosure:
  (a) "Web Services Management Approaches", by J. A. Farell and H. Kreger, pages 212 through 227, IBM Systems Journal, Vol. 41, No. 2, 2002; and
  (b) "IBM WebSphere Application Servers CORBA Interoperability", IBM WebSphere Document Version 2.3, published Mar. 21, 2002.

BACKGROUND OF THE ART

1. Field of the Invention

This is a continuation application of U.S. patent application Ser. No. 10/246,909, filed on Sep. 19, 2002 by Peter Daniel Birk, which is now issued as U.S. Pat. No. 7,448,066. This invention relates to, but is not limited to, the fields of application server security management systems and tools.

2. Background of the Art

Application servers are server programs executed by a computer or computing platform in a distributed network such as an intranet or the Internet, and which provide business logic for an application or service. Companies such as International Business Machines ("IBM"), Microsoft Corporation and Sun Microsystems provide software suites for developing, managing, deploying, and running application servers on a wide variety of hardware platforms including, but not limited to, personal computers, network servers, mainframes, and workstations, targeted for a wide variety of operating systems including, but not limited to, UNIX, Linux, IBM's AIX, OS/2, and OS/390, Microsoft's Windows, and Sun's Solaris. IBM provides a well-known and widely-used application server suite known as WebSphere™.

Application servers may be developed in high level languages ("HLLs") such as "C", portable languages such as Sun Microsystem's Java, and combinations thereof. Portions of application logic may be embodied in Enterprise Java Beans ("EJB"), dynamic link libraries ("DLL"), program objects, applets, and servelets, depending upon the design methodology(ies) and language(s) used to develop the application server program.

Application servers typically cooperate with client computers and processes, such as web browsers and remote terminals, to interface to a user in order to perform a needed function or service. Common protocols for interacting with client computers and processes include, but are not limited to, hyper text transfer protocol ("HTTP"), transmission control protocol/Internet protocol ("TCP/IP"), secure sockets layer ("SSL"), and file transfer protocol ("FTP"). Client processes for cooperation with an application server may include, but are not limited to, stand-alone (e.g. browser independent) client programs, hypertext markup language ("HTML") resources, browser extensions and plug-ins, extensible markup language ("XML") resources, graphics and multimedia objects (e.g. TIFF, GIF, JPEG, AVI, etc.), Java server pages ("JSP"), active server pages ("ASP"), personal home pages ("PHP"), Java modules, and Java Beans.

Application servers may interact with other system resources such as file systems and databases to read, store, create and copy data, as well. These system resources may be directly managed by an application server, such as a local cache, or may be accessible through and manage by other servers.

Application servers also often cooperate with security authorization and authentication servers to determine whether a user is who the user claims to be, and whether the user has permission or privileges to perform the actions requested, access the resources or data needed, etc.

Protocols for communications between application servers and such authorization and authentication processes, as well as with other system resources, may include any of the protocols previously listed for client communications, and often include other protocols defined by proprietary specifications as well as "open" standards such as Java Version 2 Enterprise Edition ("J2EE") interface and communications models and Common Object Broker Request Architecture ("CORBA").

Several implementations of CORBA are available in the industry, including IBM's SOM an DSOM architectures, Netscape Corporation's Open Network Environment ("ONE"), Sun Microsystem's RMI, and Microsoft's COM and DCOM architectures. These architectures allow client application program objects to "discover" the existence of other program objects which may be useful or needed for completion of a task or service. An Object Request Broker ("ORB") is a component of such an architecture to which clients can send requests for particular functions. The ORB then forwards these requests to appropriate servers of which the ORB is aware and which can handle the function needed by the client. The client and server(s) then interact to determine appropriate interfaces to use so that the client may use the program objects provided by the server.

Of particular use in the CORBA architecture is the definition of Interoperable Object References ("IOR"). IOR's provide object references which are independent of platform on which the objects reside, and which are independent of ORB implementation.

As these types of applications which distributed objects have become more and more complex, a number of application management systems have been brought to market. Application management includes control and monitoring of an application from its installation and configuration, through its useful lifecycle including collection of metrics and tuning to maximize efficiency and responsiveness. The model adopted by application management systems is often a manager-agent model. The application is responsible for providing certain information to the management system, responding to requests for information actions from an agent of the management system, and communicating with an management system agent. The management system agent typically executes on the same hardware platform as the application which is being managed.

The management system communicates to one or more agents which are themselves in touch with the applications being managed. The management system may communicate with its agents using a proprietary protocol, or may use an "open" protocol such as Simple Network Management Protocol ("SNMP") or Java Management Extensions ("JMX"). Some example management systems available on the market are Tivoli's Management Environment and IBM's WebSphere administration application.

Turning to FIG. 3, one embodiment of such a management system is shown using JMX Management Beans, or MBeans. MBeans are objects which are accessible via the standard JMX interfaces, and which provide developers with abilities to expose application-specific management interfaces. The JMX MBeanServer (33) runs the Application Server MBean (34), which is responsible for exposing interfaces of the application server (31) to the management application (37). Likewise, the JMX MBean Server (33) also runs the Application MBean (35), which exposes the application-specific management interfaces for the application (32) to the management application (37). The MBeanServer (33) also provides any adapters (36) necessary to bridge one or more management systems to the application so that the administration facilities of the application managers can be used in conjunction with the application.

In current versions of the IBM WebSphere™ Application Server product, an administrative server is the central point of contact where all administrative requests are directed. Securing this administrative server only required configuring application servers as secure clients, but the applications servers did not have to be configured as secure servers. As no user objects are allowed on the administrative server, and no administrative objects were allowed on the application servers, this approach met the needs in the art for some time.

However, as applications have evolved to include administrative functions and to use administrative objects on the application server, object level security (instead of server level security) is needed but not supported by legacy architectures. In some systems, all application processes include administrative resources which need to be protected, even though user resources may or may not need to be protected. Under present security schemes which are server-level security schemes, administrative object security would be disabled if user object security is disabled. For user objects and resources which really do not need to be secure, this enforces a performance penalty unnecessarily and undesirably by requiring authentication and authorization processes to be applied to these user objects. If the system is configured to disable security which by default includes disabling administrative resource security, the system is unnecessarily and undesirably exposed to security breach via the administrative functions. Therefore, there is a need in the art for a system and method which allows for object-level security configuration for application servers which contain user objects and administrative objects.

BRIEF DESCRIPTION OF THE DRAWINGS

The following detailed description when taken in conjunction with the figures presented herein provide a complete disclosure of the invention.

SUMMARY OF THE DISCLOSURE

Figure 1:
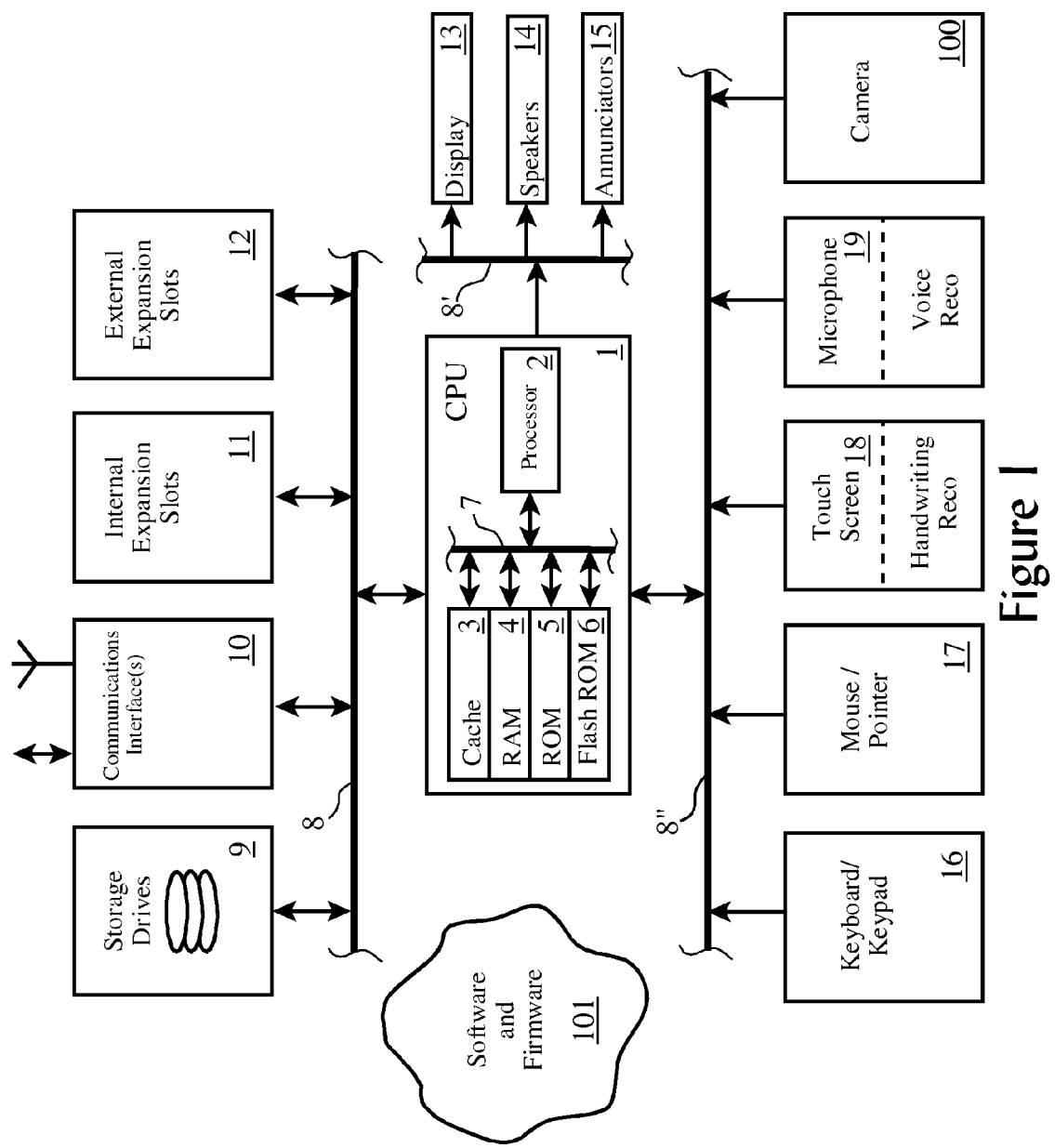
FIG. 1 depicts a generalized computing platform architecture, such as a personal computer, server computer, personal digital assistant, web-enabled wireless telephone, or other processor-based device.

Processes and mechanisms are provided which allow security for administrative objects and naming objects to be separately and declaratively enabled and disabled apart from security enablement for user object security on an application server-by-server basis within a security domain. This provides the ability to disable user security while maintaining administrative security in the same process, especially within an application environment based upon the IBM WebSphere Application Server product.

Customers (e.g. application server owners and operators) may selectively disable user object security on some application servers within a security domain, while maintaining security of user objects on other applications servers, and while being assured of global administrative object security throughout the security domain. Administrative functions such as administrative security, internal system management, etc., can therefore be managed separately from user security.

Using the processes and mechanisms disclosed herein, the client process(es) are unaware of whether an application object is a user object or an administrative object, but is only aware of each object's requirement to perform security functions or not. Additionally, our process allows for declarative definition of which objects are to be protected by class and package.

In general, to achieve object-level security configurability of an application server, a CORBA architecture is adopted in which the ORB exports IOR's to the name server for shared objects. IOR's for objects which are to be secured such as administrative objects are provided with tagged components which indicate security details for use of that service. IOR's for insecure objects such as user objects are exported without tagged components. An IOR interceptor is invoked when any given object is exported. The IOR interceptor loads a descriptor file listing all of the administrative objects or administrative packages which need to be protected. This allows specification of a single object, list of individual objects, or package of objects to be protected when global security is enabled within the security domain.

For objects in this descriptor file, IOR's are exported having security tagged components. Later, when a client picks up a tagged IOR, the client is made aware of the security requirements to invoke a request for that service. If no tags are provided in the IOR, then the service can be requested without security measures. For these insecure objects, the client will not send any user security information to the application server, nor will it protect the transport to the application server, which results in a performance improvement for those user objects and avoids unnecessarily protecting user objects.

Generally, two types of flags are utilized to configure object-level security in a domain: (a) a global (domain-wide administrative security) security flag, and (b) one or more application server security flags. While the former is maintained at the domain level, the latter are specific to each application sever. The global security flag determines whether or not all administrative objects are secured throughout the domain. These administrative objects are also listed in the aforementioned descriptor file. Each application server security flag enables or disables security for user objects on the application server to which it pertains only, but does not affect security of the administrative objects on that server.

DETAILED DESCRIPTION

The invention is preferably realized as a feature, extension, or improvement of the enterprise server software already found present on well-known computing platforms such as personal computers, web servers, and web browsers. These common computing platforms can include personal computers, work stations, and mainframes, and conceivably suitably capable portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
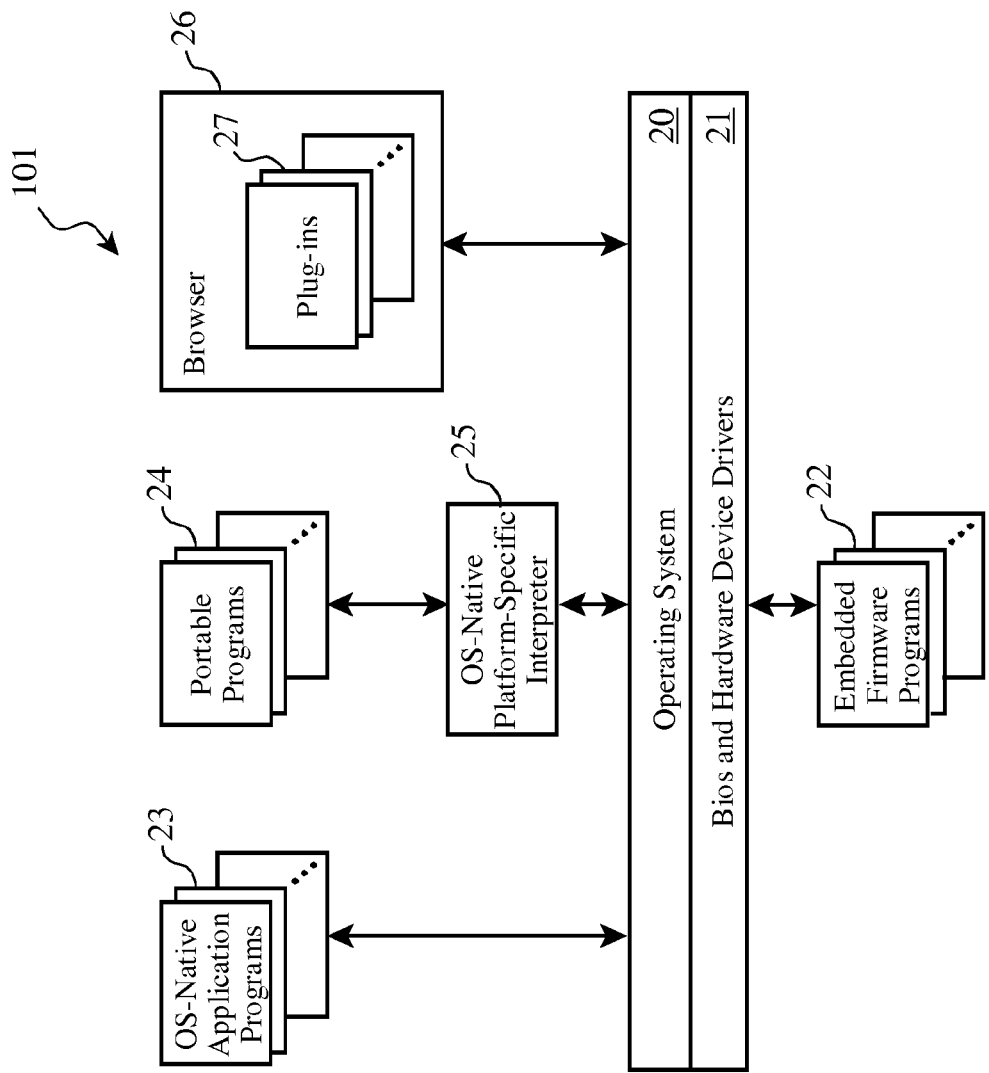
FIG. 2 shows a generalized organization of software and firmware associated with the generalized architecture of FIG. 1.
Figure 3:
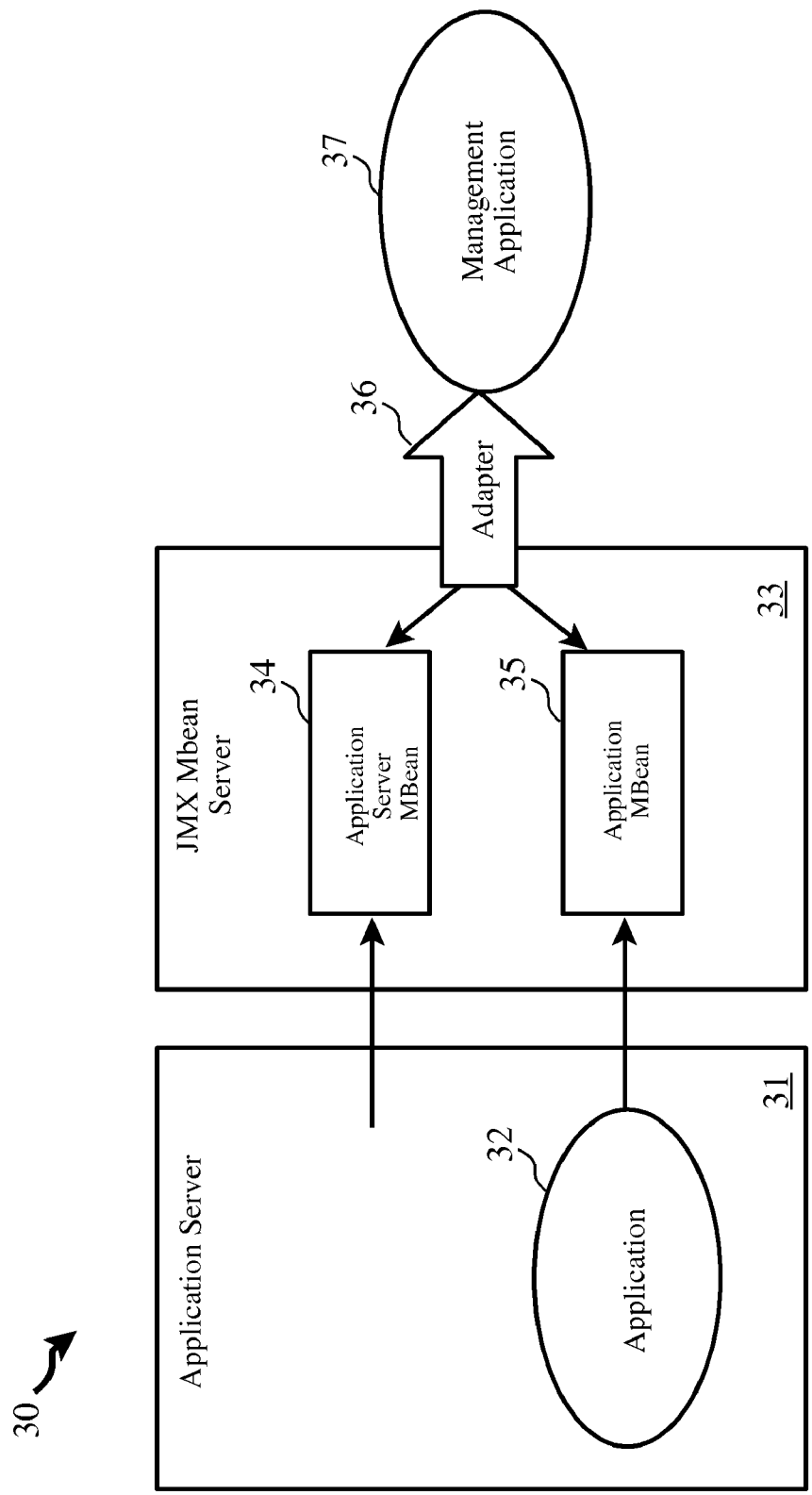
FIG. 3 illustrates a typical arrangement of a management system and application.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java™ scripts and programs.

Often, computing platforms are also provided with a form of web browser or micro-browser (26), which may also include one or more extensions to the browser such as browser plug-ins (27).

The computing device is often provided with an operating system (20), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

We now turn our attention to description of the method of the invention and it's associated components. In one possible embodiment, it is realized as a collection or set of Java Beans which access and modify certain system files and resources as described in more detail in the following paragraphs, but may well be integrated into existing software such as web server suites without departing from the spirit and scope of the invention.

In an exemplary embodiment, a CORBA architecture is employed in which objects are defined with the OMG Interface Definition Language ("IDL"), objects are distributed among servers and clients, and an Object Request Broker ("ORB") is used to coordinate discovery of and use of available objects and services. IDL compilers implement CORBA bindings, and generate client stubs and server skeletons which map each object's services from the server environment to the client. Communication protocols between clients and servers and between servers themselves is the General Inter-ORB Protocol ("GIOP"), and Inter-ORB Protocol ("IIOP") which implements GIOP over the Transmission Control Protocol/Internet Protocol ("TCP/IP"). Interoperable Object references ("IOR") provide platform-independent and ORB-implementation-independent object references. A naming service is provided within the CORBA architecture which binds each CORBA object to a public name.

Further in this exemplary embodiment, an Enterprise Java Bean ("EJB") programming model is employed in which object interfaces and server implementation conform to Java definitions, objects are distributed such that they can be remotely accessed, and Java communications protocols are used including Remote Method Invocation ("RMI"). As this exemplary embodiment is implemented using the IBM WebSphere™ Application Server product running under the AIX or Linux operating system on an IBM enterprise server. As current versions of WebSphere only support RMI-IIOP, clients should not use the RMI-JRMP format of Java RMI protocol. In other embodiments using other web application environments, this restriction may not be necessary. The Java Naming Service ("JNDI") is employed for the naming service in this exemplary embodiment, as well.

While the general CORBA and EJB concepts, protocols, programming methodologies, and functions are well known in the art generally, and while the WebSphere product is in widespread use and well known itself, it will be recognized by those skilled in the art that the present invention may be realized with other programming methodologies, protocols, computing platforms, operating systems architectures, and web application server products without departing from the scope of the invention. For example, some application servers which could potentially be used to realize the invention include Oracle's 9i product, BEA Systems WebLogic platform, Sun Microsystem's ONE application server, Hewlett-Packard's application server, and JBoss. As for operating systems, Unix, Linux, Novell's Netware, IBM's AIX and OS/2, Sun Microsystem's Solaris, Hewlett-Packard's HP-UX, and Microsoft's Windows products may also be alternatively employed in alternate embodiments.

Figure 4:
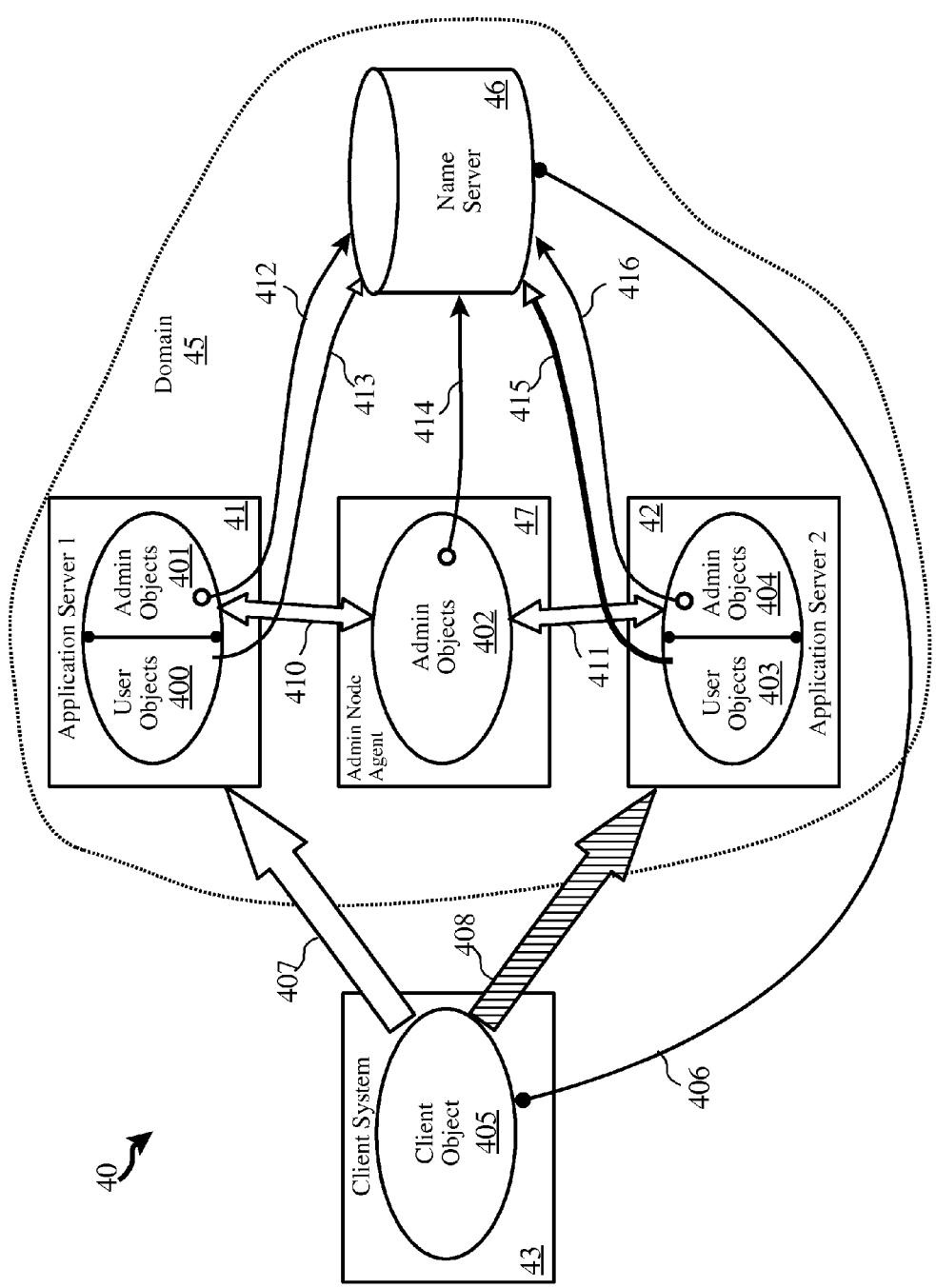
FIG. 4 sets forth an exemplary embodiment of the process and interactions of the present invention.

Turning now to FIG. 4, the interactions and relationships (40) a client system (43) with multiple application servers (41, 42) according to the invention is shown, including an administration node agent (47) and a name server (46). The application servers (41, 42), administration node agent (47) and name server (46) are part of a domain (45) from which an application is provided to the client system (43).

As applications are started up, certain initialization procedures occur where an IOR interceptor is loaded, and references to shared objects are exported (412, 413, 414, 415, 416) from each application server (41, 42) to a name server (46) so that the shared objects may be found by a client (43).

When objects are being exported to the name server, an IOR interceptor is invoked against every object. During this creation time in which an ORB creates the IORs, all of the IOR interceptors for every component which has one are invoked. The purpose of these IOR interceptors is to add tagged components to the IOR, which are additional information that allow the servers to export information about the services performed by the service. The information can then be read by clients needing to use the service. For a security service for example, the information placed in these tagged components may contain parameters including such information as an indication of the secure sockets layer ("SSL") port to which the server is listening, what type of SSL connection must be made with the server by the client, what security mechanisms are supported by the server, what types of information are needed from the client (e.g. user name, password, certificate, etc.), and what the realm of the server is so that the client can prompt the user with the server realm for log in purposes, etc. If security is disabled, no tagged components are added to the IOR.

When an IOR interceptor is loaded, the interceptor loads a file, such as a text file which contains class and package names of administrative objects which need to be secure even when other user objects are not secure on an application server. Administrative objects may be deemed by an administrator as needing to be secure always, regardless of whether user objects on an application server are secure or insecure. For example, in this figure, Application Server 1 (41) provides user objects (400) and administrative objects (401) which are all secure. So, secure IOR's are exported (412, 413) to the name server (46). However, Application Server 2 (42)

provides user objects (403) which do not need to be secure, so insecure IOR's for these objects (403) are exported to the name server (46), while secure IORs are exported (416) for the secure administrative objects (404) on the same server (42).

This allows a customer to disable security on a server by server basis, without compromising administrative security. Global security (e.g. entire domain security) must still be enabled when an administrator is manipulating application server security. With security for a particular application server disabled and global security enabled, the IOR interceptor may load the list (e.g. text file) of classes and packages which are to be kept secure regardless of user object security status, and to determine if and what kind of tagged components are to be exported for each secured administrative object. User objects are not members of this list of packages or classes to maintain as secure, and thus a declarative method is provided to an administrator to modify which classes remain secure within the domain. As such, user objects are not included in the list, and thus their IOR's do not receive tagged components; administrative objects are included in the list, and their IOR's receive tagged components if they are deemed as security sensitive. All objects, whether user objects or administrative objects, are added to the name space handled by the name server (46). This creates a class-based object security scheme which is declaratively configurable.

Using this arrangement and process, when a client object (405) requests use of object from a server where security is fully enabled such as Application Server 1 (41), all transactions (407) between the client (43) and the objects (400, 401) are conducted securely. The client object (405) receives the tags when it looks up (406) with the name server (46) the IOR's for the objects on application server, which indicate that all objects (400, 401) are secured and must be used (407) securely. A authentication and authorization process may be securely employed (410) to provide security services, as indicated by the tags, such as a WebSphere authentication engine and authorization engine, as provided by an administrative node (47) and one or more administrative objects (402).

When a client process attempts to use an user object (403) provided by Application Server 2 (42) where Application Server 2 has user object security disabled, the look up (406) action will result in no tags being received by the client process, and thus no security processes will be employed when interacting (408) insecurely with the user objects (403). Thus, communications and interactions (408) with these user objects (403) may be conducted anonymously (e.g. without authentication or identity information) and/or "in the clear" (e.g. without transport protection). When administrative objects (404) provided by Application Server 2 (42) are used, however, the look up action will result in receipt of the tags which will cause security functions from the administrative node to be invoked, such as the WebSphere authorization engine and authentication engine. Thus, Application Server 2 successfully allows the user objects (403) to be used by the client without security and with inherent performance increases that implies (e.g. no authentication by the client required, no authorization by the server required, no credential creation and storing, etc.), while the administrative objects (404) are kept secure.

For ease of understanding in FIG. 4, box arrows (wide arrows) with cross hatching indicate insecure communications or interactions (e.g. 408), while box arrows without cross hatching indicate secure communications or interactions (e.g. 407, 410, 411). Likewise, thin arrows (e.g. 412, 413, 414, 415, 416) indicate operations exporting IORs for secure objects with tagged components, while the heavier line with arrowhead (e.g. 415) indicates a exporting of IORs for insecure objects without tagged components.

To summarize and review this new process, after IORs have been appropriately created with or without tagged components, when there is an insecure, unauthenticated request from a client for a user object, the client object will look up the IOR, receive the IOR, and the ORB will call one or more request interceptors, including a security request interceptor. Since no tagged components are included with the IOR, it will make a TCP/IP request without authentication and without SSL. This allows the insecure user objects to be used without credentials, authentication or authorization. However, use of any administrative objects or secured user objects will trigger authentication and authorization processes, as well as use of secure communications (e.g. SSL), even though these secured objects are in the same domain as the insecure user objects.

Figure 5:
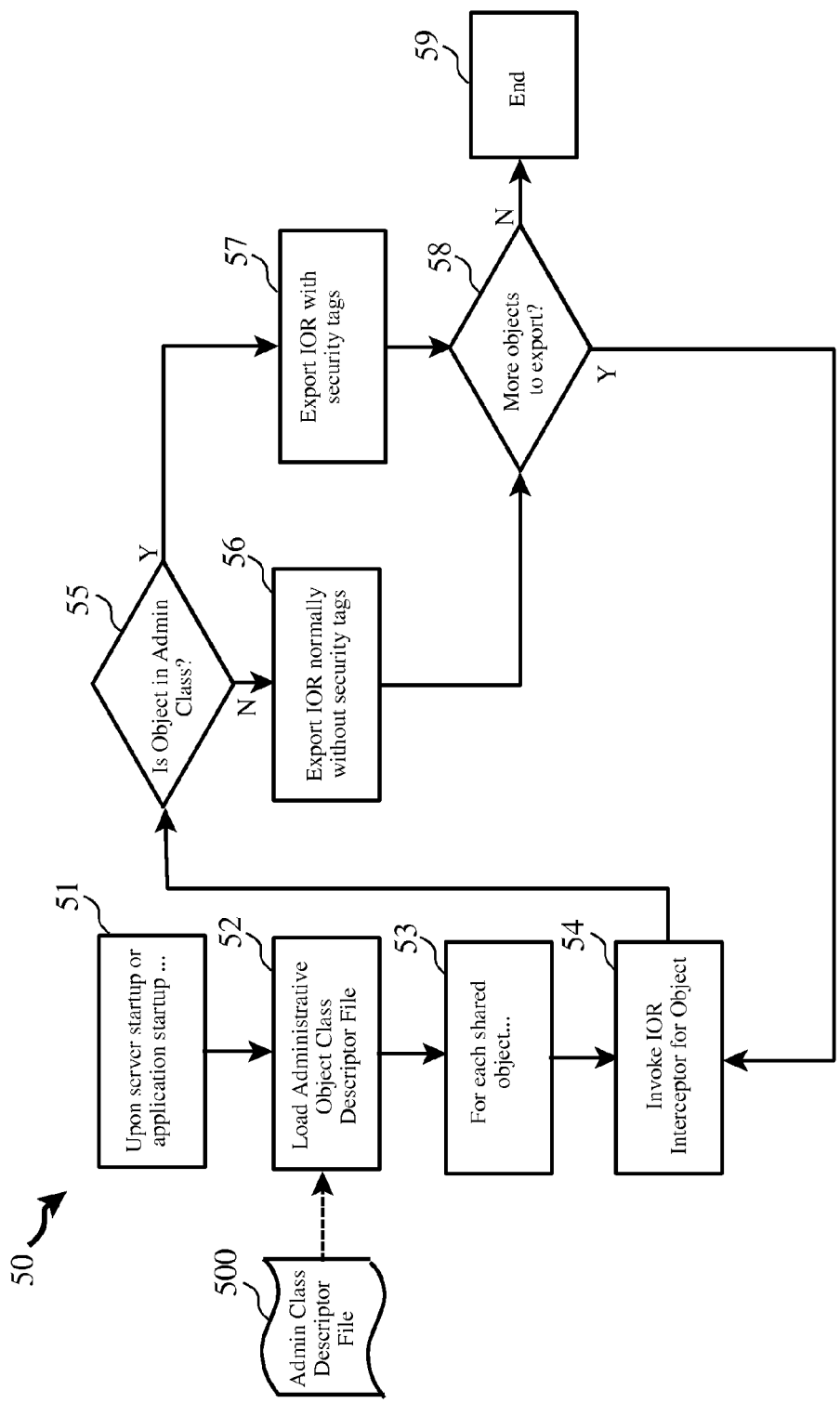
FIG. 5 graphically depicts the process of exporting IOR's for shared objects with tagged components in the IIOP model implementation.

FIG. 5 graphically depicts the previously described process (50) of exporting IOR's for shared objects with tagged components. Upon server or application startup (51), the administrative class descriptor file (500) is accessed or loaded (52), and for each shared object (53), an IOR interceptor is invoked (54). If the object is in the administrative class (55), either specified directly or as part of a specified package, then an IOR is exported (57) with security tags. If the object is not in the administrative class, then an IOR for that object is exported normally (56) without special security tags. This is repeated (58) for all objects which are shared and for which IOR's are to be exported.

Figure 6:
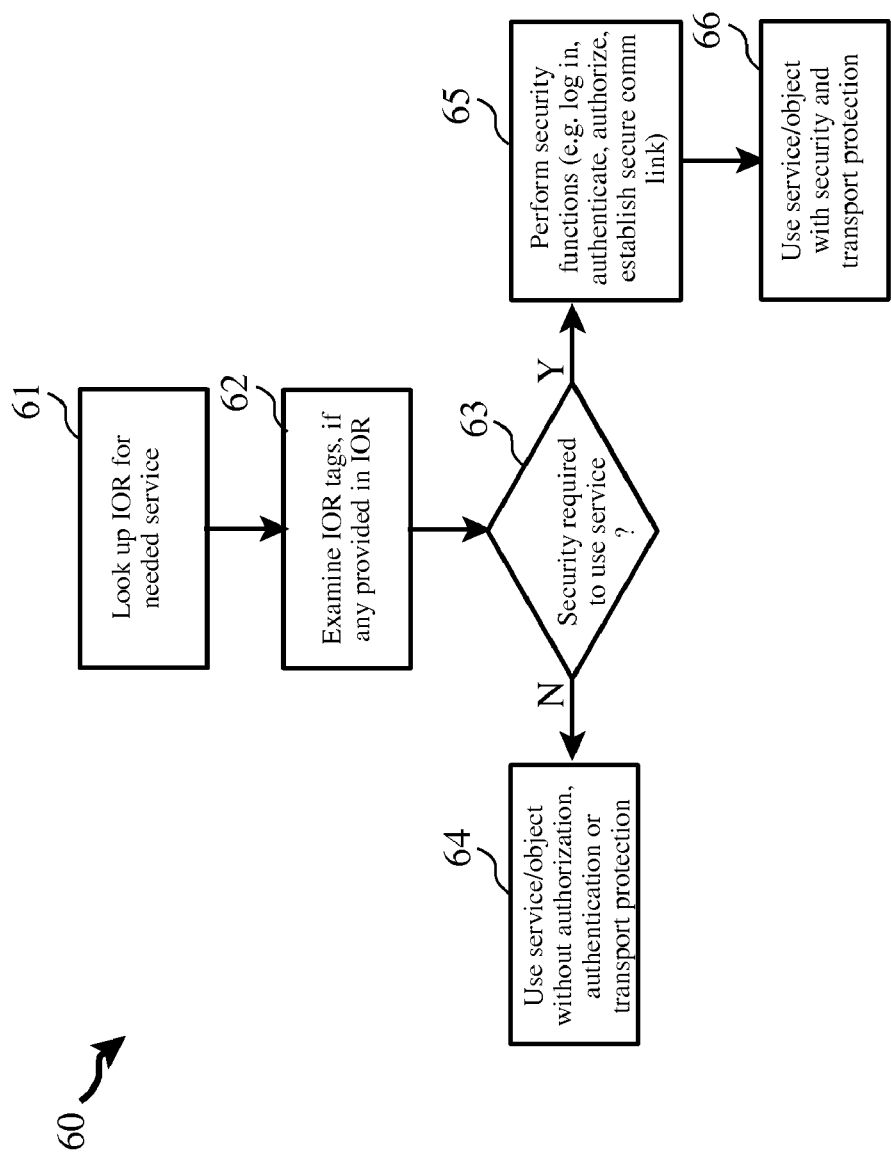
FIG. 6 graphically depicts the process for a client to request a shared object or service in the IIOP model implementation.

FIG. 6 graphically depicts the process (60) previously described for a client to request a shared object or service. The IOR is looked up (61) for the needed service, and the received IOR is examined (62) for security tags. If (63) security such as authentication, authorization, and/or transport protection is required to use request and use the service, then the required actions are performed (65) to authenticate, authorize and/or establish a secure communications link to the application server. Otherwise (63), the service is requested and used normally without security measures.

Further, according to this exemplary embodiment using the WebSphere platform, a separate authorization engine for administrative objects is provided from the authorization engine for user objects. The WebSphere administrative authorization engine provides a role-based authorization model or process. By having a separate authorization engine for the user objects, any J2EE may be used for the user object security. Because of the unique usage of our separate user object security flags and administrative object flags (e.g. global security flag), the system is enabled to separately define and manage the security of user objects and administrative objects with different authorization and authentication engines. This allows three security modes to be configured:

(a) when application server security is enabled and global security is enabled, all objects (user and administrative) are secured on a given server within a domain;

(b) when application server security is disabled and global security is enabled, only user objects are insecure and administrative objects are maintained secure on a particular server; and (c) when global security is disabled, all objects (user objects and administrative objects) are insecure for a all servers within a domain.

In the embodiment of FIG. 4 when using WebSphere and CORBA, the client object (405) and user objects (400, 403) are Enterprise Java Beans (EJB's), and the administrative objects (401, 402, and 404) are Java Management MBeans. Other suitable, object-oriented programming languages may be used alternatively.

The background of the art, summary of the disclosure, abstract, and detailed description have been provided including with a variety of embodiment options, and with specific reference to specific application server products, operating systems, computing platforms, programming methodologies, and communication protocols. It will be readily recognized by those skilled in the art that these details are provided for illustration and understanding of the invention, and that the scope of the invention is not limited to these embodiment details but is defined by the following claims.

For example, the present disclosure has presented an embodiment and details thereof using CORBA, IIOP, and IOR to describe the inventive object level security processes and mechanisms. The invention can be applied to other security protocols and object models, as well, including but not limited to WebService security. In a WebService Security model, message passing and method invocation is carried by Simple Object Access Protocol ("SOAP") messages instead of the IIOP security protocol, and services are described using Web Services Definition Language ("WSDL") and Web Service Endpoint Language ("WSEL") instead of IDL. Correspondingly, Universal Description, Discovery and Integration ("UDDI") is used in the Web Services model in place of CORBA's CosNaming, the latter providing API for looking up an IOR, while the former provides an API for looking up a BusinessEntry and Web Service entry. So, in our illustrative embodiment disclosed herein, we have used the IOR as a mechanism to carry object type information for an object instance, which may be realized in alternate object models and security protocols accordingly, such as providing object type information in a Web Services UDDI object registry.

What is claimed is:

1. A computer readable memory device encoded with software for use in a distributed computing domain, the software performing steps comprising:
    distributing administrative objects and user objects to one or more application servers;
    allowing a user to declare in a list which objects residing on each application server are to be protected;
    reading the list by an interceptor;
    responsive to exportation of a Common Object Request Broker Architecture ("CORBA") compliant Interoperable Object Reference ("IOR") for a listed object, associating by the interceptor one or more application server security flags with interfaces to the listed objects by tagging components of the IOR with one or more security flags; and
    performing one or more security operations by an application server according to the security flags tagged to the IOR when a client accesses an application server-stored object, the security operations including an operation besides establishing secure communications between the client process and the server-stored object.

2. The computer readable memory device as set forth in claim 1 wherein the software for performing security operations comprises software for providing separate security operations for administrative objects and user objects.

3. The computer readable memory device as set forth in claim 1 comprising a WebSphere compliant application server.

4. The computer readable memory device as set forth in claim 1 comprising an Enterprise Java Bean compliant client process.

5. The computer readable memory device as set forth in claim 1 comprising Enterprise Java Beans compliant user object.

6. The computer readable memory device as set forth in claim 1 comprising an Mbean compliant administrative object.

7. The computer readable memory device as set forth in claim 1 comprising software for performing a security operation selected from the group of authentication and authorization.

8. The computer readable memory device as set forth in claim 1 comprising software for employing a security protocol selected from the group of Simple Object Access Protocol and Inter-ORB Protocol.

9. The computer readable memory device as set forth in claim 1 comprising software for employing a service description model selected from the group of IDL and Web Services Definition Language with Web Service Endpoint Language ("WSEL") and Interface Definition Language.

10. An object-level security system in a distributed computing domain comprising:
    one or more administrative objects and one or more user objects distributed among one or more computer readable memory devices of one or more application server computers;
    a user-declared list of objects residing in computer readable memory devices of each of the application server computers which are to be protected;
    an interceptor portion of a computing platform configured to read the list, and to, responsive to exportation of a Common Object Request Broker Architecture ("CORBA") compliant Interoperable Object Reference ("IOR") for a list object, to associate one or more application server security flags associated with interfaces to the listed objects by tagging components of the IOR with one or more security flags; and
    one or more security operations performed by an application server computer in cooperation with a client process responsive to access by the client process of an object having a tagged IOR, said security operations including an operation besides establishing secure communications between the client process and the server-stored object.

11. The system as set forth in claim 10 wherein the security operation comprises separate security operations for administrative objects and user objects.

12. The system as set forth in claim 10 comprising a WebSphere compliant application server.

13. The system as set forth in claim 10 comprising an Enterprise Java Bean compliant client process.

14. The system as set forth in claim 10 comprising an Enterprise Java Bean compliant user object.

15. The system as set forth in claim 10 comprising an MBean compliant administrative object.

16. The system as set forth in claim 10 comprising a security operation selected from the group of authentication and authorization.

17. The system as set forth in claim 10 comprising a security protocol selected from the group of Simple Object Access Protocol and Inter-ORB Protocol.

18. The system as set forth in claim 10 comprising a service description model selected from the group of IDL and Web Services Definition Language with Web Service Endpoint Language and Interface Definition Language.

* * * * *